(12) United States Patent
Cottingham, III et al.

(10) Patent No.: US 8,242,625 B2
(45) Date of Patent: Aug. 14, 2012

(54) AIRCRAFT POWER SUPPLY AND METHOD OF OPERATING THE SAME

(76) Inventors: John DeWitte Cottingham, III, Anderson, SC (US); Steve John Kempinski, Seneca, SC (US)

( * ) Notice: Subject to any disclaimer, the term of this patent is extended or adjusted under 35 U.S.C. 154(b) by 290 days.

(21) Appl. No.: 12/652,963

(22) Filed: Jan. 6, 2010

(65) Prior Publication Data
US 2010/0171365 A1 Jul. 8, 2010

Related U.S. Application Data

(60) Provisional application No. 61/142,993, filed on Jan. 7, 2009.

(51) Int. Cl.
*B60L 1/00* (2006.01)
(52) U.S. Cl. ......................................................... 307/9.1
(58) Field of Classification Search .................... 307/9.1
See application file for complete search history.

(56) References Cited

U.S. PATENT DOCUMENTS 5,122,724 A 6/1992 Criss
6,462,429 B1 * 10/2002 Dhyanchand et al. .......... 290/31
7,579,814 B2 * 8/2009 Orr ................................ 323/259
2010/0182813 A1 * 7/2010 Asano et al. ................... 363/126

FOREIGN PATENT DOCUMENTS

GB 2436647 A 10/2007

OTHER PUBLICATIONS

John Dewitte Cottingham III, P.E., William Bassett and George Melendez, "Aircraft DC Power Quality Characteristics of a PCTRU", Copyright © 2008 SAE International, 7 pages.
"Flyback Diode", Wikipedia.org article dated Oct. 22, 2008, retrieved from http://en.Wikipedia.org/w/index.php?title=Flyback_diode&oldid=246915258, 4 pages.
GB Search Report for Application No. GB1000149.3 dated Apr. 30, 2010, 1 page.

* cited by examiner

*Primary Examiner* — Robert L. Deberadinis
(74) *Attorney, Agent, or Firm* — Reising Ethington P.C.

(57) ABSTRACT

An aircraft power supply for providing DC power with improved power quality characteristics to the aircraft. According to one embodiment, the aircraft power supply includes an input filter, a step-down transformer, one or more rectifier networks, and an output filter with a voltage modulation attenuator to passively improve power quality characteristics. The voltage modulation attenuator may use a certain arrangement of inductors, capacitors and diodes to reduce voltage transients in the aircraft power supply.

11 Claims, 3 Drawing Sheets

US 8,242,625 B2

AIRCRAFT POWER SUPPLY AND METHOD OF OPERATING THE SAME

CROSS-REFERENCE TO RELATED APPLICATION

This application claims the benefit of U.S. Provisional Application No. 61/142,993, filed Jan. 7, 2009, the entire contents of which are hereby incorporated by reference.

TECHNICAL FIELD

The present invention relates generally to power supplies and, more particularly, to aircraft power supplies that provide DC power.

BACKGROUND

Aircraft electrical systems usually include electrical components, devices, equipment, etc. that require certain power quality characteristics. For example, certain electrical components may not function properly if there are electrical disturbances in the DC power supply. Electrical disturbances can include a wide range of phenomenon, including power interruptions, high voltage transients, low voltage transients, ripple voltages, and more.

The power quality characteristics experienced during testing can vary dramatically from those experienced during actual aircraft operation. During testing, the DC power can be provided by a programmable power supply in a highly regulated and stable environment. During actual aircraft operation, however, the DC power is usually derived from an AC generator coupled to an engine that is operating at variable speeds, from which the AC power is transformed, rectified, filtered, etc. The variable nature of this operation, as well as other factors, can result in DC power that exhibits less than ideal power quality characteristics.

SUMMARY OF THE INVENTION

In accordance with one aspect of the invention, there is provided an aircraft power supply that includes a DC power output and a voltage modulation attenuator coupled to at least one terminal of the DC power output and having at least one inductor and at least one diode connected in parallel. In some embodiments, the aircraft power supply can be the type that includes a transformer having a secondary connected to a rectifier circuit that is connected via the voltage modulation attenuator to the DC power output. Also, in some embodiments, the voltage modulation attenuator can include the diode connected in parallel across the inductor in a reverse current flow direction and can include one or more additional diodes connected in parallel across the inductor in a forward current flow direction. The voltage modulation attenuator provides an improved quality of DC output voltage, such as by providing reduced transients and voltage ripple on the supplied DC power.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The aircraft power supply described herein can provide DC power with improved power quality characteristics, and can do so without compromising the reliability of the system. Although the aircraft power supply is described below in the context of an AC/DC system that uses a transformer rectifier unit (TRU) to provide DC power, it should be appreciated that other embodiments could be used as well. For instance, the aircraft power supply could provide any combination of: variable frequency AC power, constant frequency AC power, and/or DC power, and is not limited to only providing DC power.

Figure 1:
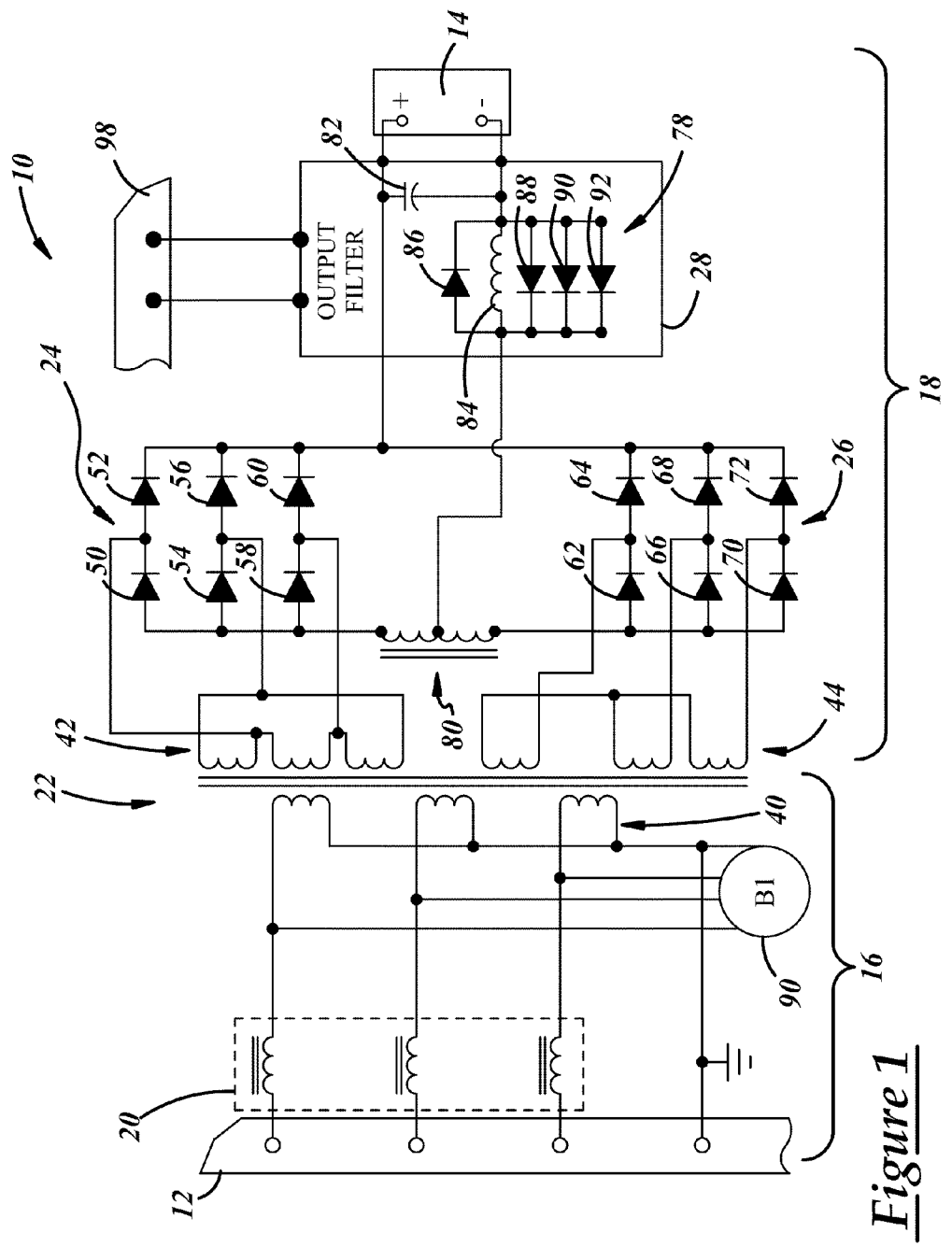
FIG. 1 is a schematic view of an exemplary aircraft power supply that may provide improved power quality characteristics.

According to the exemplary embodiment shown in FIG. 1, aircraft power supply 10 receives AC power from an aircraft generator at receptacle 12 and provides DC power to a DC power output 14. The AC power may be provided as a three-phase, 115 V (RMS) waveform at a constant frequency of 400 Hz, but other power inputs can be used instead. For purposes of illustration, aircraft power supply 10 is divided into a high-voltage section 16 which includes an input filter 20 and primary windings of a transformer 22, and a low-voltage section 18 which includes secondary windings of transformer 22, rectifier networks 24, 26, and an output filter 28. According to one embodiment, output filter 28 includes a certain arrangement of inductors, capacitors and diodes that passively improve the power quality characteristics of aircraft power supply 10.

Input filter 20 receives AC power from aircraft generator at receptacle 12 and may include a number of inductors and/or other electrical components that filter or otherwise condition the incoming AC voltage signal. In one example, an integrated drive generator (IDG) may be used to convert variable-speed mechanical output from an aircraft engine into constant-speed mechanical output, so that aircraft generator at receptacle 12 can produce constant frequency (CF) electrical power. The CF electrical power, which may be a three-phase signal where each phase is separated by 120°, can then be provided to input filter 20 for filtering, etc. Other aircraft generators, AC power supplies and input filters can also be used.

Transformer 22 steps down the voltage of the AC power provided by aircraft generator 12 to a level that is more suitable for the electrical components of the aircraft. In one example, transformer 22 steps down a 115 V (RMS) signal to a voltage of approximately 28 V (RMS); however, other voltage levels could be used. In the embodiment shown here, transformer 22 includes primary windings 40 that are arranged in a wye configuration and secondary windings 42, 44 arranged in a delta-wye configuration, respectively. As mentioned above, primary windings 40 may be part of high-voltage section 16 and secondary windings 42, 44 may be part of low-voltage section 18. This is, of course, only an exemplary transformer arrangement, as other winding arrangements and topologies known in the art could also be used. Another possible transformer arrangement includes a delta primary and a delta-wye secondary, as is known to those skilled in the art.

Rectifier networks 24, 26 are connected to secondary windings 42, 44, respectively, and rectify the stepped-down AC power so that DC power can be provided to DC power output 14. In the embodiment shown here, rectifier networks 24, 26 are provided in the form of a bank of power diodes 50-72 that provide full-wave rectification of the stepped-down secondary voltage. Rectifier networks 24, 26 are connected through an interphase transformer 80, which magnetically couples the delta- and wye-secondary windings 42, 44 together. Interphase transformer 80 may include a pair of higher voltage taps connected to a failure sensing relay that provides converter status information to one more aircraft components, such as a FADEC system. Rectifier networks 24, 26 are generally connected to DC output 14 via output filter 28.

Output filter 28 is connected on the output side of rectifier networks 24, 26 and may be used to passively improve the power quality characteristics of the power provided on the DC power bus. The output filter may be arranged in a number of different ways, including the exemplary one shown here. According to this particular embodiment, output filter 28 includes a voltage modulation attenuator 78 having a capacitor 82, an inductor 84, a reverse diode 86 and several forward diodes 88-92, which together may reduce voltage transients on the DC power output terminals. Although FIG. 1 shows voltage modulation attenuator 78 generally connected to the negative terminal of DC power output 14, it is also possible for the voltage modulation attenuator to be connected to the positive terminal of the DC power output, to be connected to both the positive and negative terminals of the DC power output, or to be connected to some other component of aircraft power supply 10. Preferably, the voltage modulation attenuator is connected on the output side of rectifier networks 24, 26 and on the input side of DC power supply 14; however, this is not necessary. Furthermore, it is possible for voltage modulation attenuator 78 to be used in conjunction with actively controlled features of an aircraft power supply, such as the closed-loop transformer control system disclosed in U.S. patent application Ser. No. 12/607,090 filed Oct. 28, 2009; the entire contents of which are incorporated herein by reference.

Capacitor 82 is connected between the positive and negative terminals of DC power output 14 and may have any suitable capacitance, such as 3 mF. Inductor 84 is connected in series with the negative terminal of DC power output 14 and exhibits suitable inductive and resistive properties; in one example, inductor 84 has an inductance of between 40-60 µH and has a resistance of about 2 mΩ. Of course, inductors having other inductances and resistances could also be used. According to this embodiment, voltage modulation attenuator 78 includes a single reverse diode 86 that is connected in parallel with inductor 84 in the reverse current flow direction, and three forward diodes 88-92 that are connected in parallel with inductor 84 in the forward current flow direction. Diodes 88-92 should have a high enough current rating to withstand the anticipated operating environment and, in one example, are silicon or Shottky diodes each having an 80 amp rating. Other capacitor/inductor/diode arrangements could also be used, including ones with fewer or greater numbers of components. For example, voltage modulation attenuator 78 could include a single diode in the forward direction, where the single diode is designed to handle a large amount of current. Or, two or more diodes can be series connected and the combination placed in parallel with the inductor which will have the effect of increasing the inductor voltage drop needed to switch on the series connected diodes. It is also possible to use different diode types for the forward and reverse directions, where the diode types have different forward voltage drops. The selection of these diode types and voltage drops could be specifically made to improve power quality characteristics such as ripple voltage. It is further possible for output filter 28 and/or voltage modulation attenuator 78 to include a bleed resistor connected in parallel with capacitor 82 (e.g., a 40Ω, 25 W resistor) that limits the DC power output at no or low load conditions.

In the embodiment of FIG. 1, a fan motor 90 may be used to cool the circuit components, a receptacle 98 may be provided (e.g., an MS3102R-20-17P), and DC power output 14 can include or be connected to a terminal board, for example. It should be appreciated that the aircraft power supply shown in FIG. 1 is only an exemplary embodiment, and that voltage modulation attenuator 78 may be used with other suitable aircraft power supplies and is not limited to this particular embodiment.

During operation, aircraft power supply 10 provides the aircraft with DC power that exhibits improved power quality characteristics, including reductions in voltage transients. According to the particular embodiment shown here, voltage modulation attenuator 78 uses a passive arrangement—namely, a capacitor/inductor/diode combination—to reduce or mitigate voltage transients or spikes in the DC power output. Skilled artisans will appreciate that a number of different sources can be responsible for voltage transients in the DC power, including sources on the input side of the system (e.g., the aircraft generator, transmission lines, power converters, etc.), as well as sources on the output side (e.g., significant changes in load due to demands of different pieces of electrical equipment). The exemplary voltage modulation attenuator 78 is well suited to address voltage transients, low-to-high as well as high-to-low, that are caused by current surges drawn from DC power output 14. For example, the operation of certain military hardware may result in significant current surges or pulse loads in the DC power output that could affect other components on the aircraft. Voltage modulation attenuator 78 can improve the power quality characteristics of aircraft power supply 10 by reducing or mitigating the resultant voltage transients, and can do so without decreasing reliability through additional failure modes.

Figure 2A:
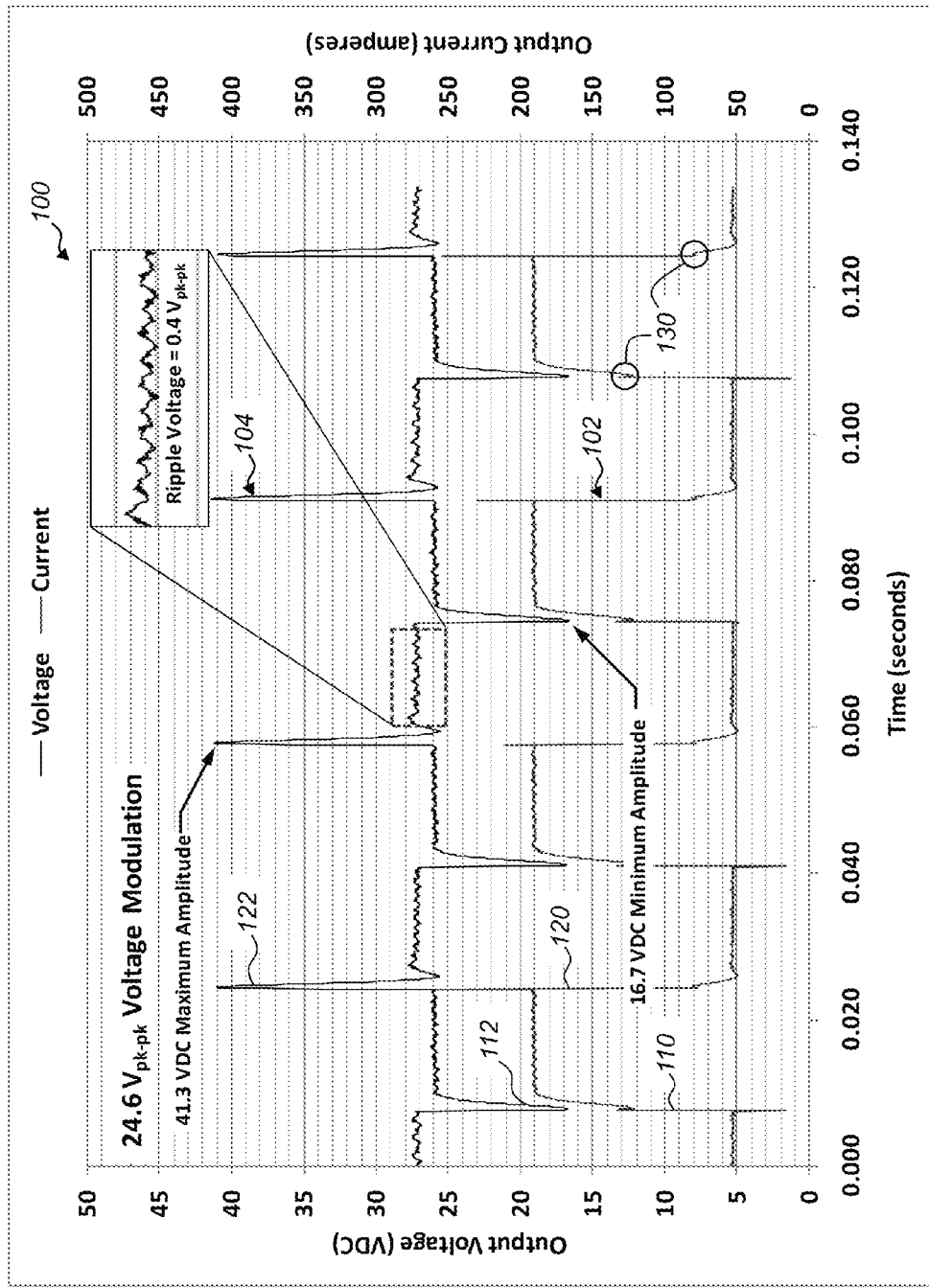
FIG. 2A is a plot of current and voltage waveforms for a prior art aircraft power supply.
Figure 2B:
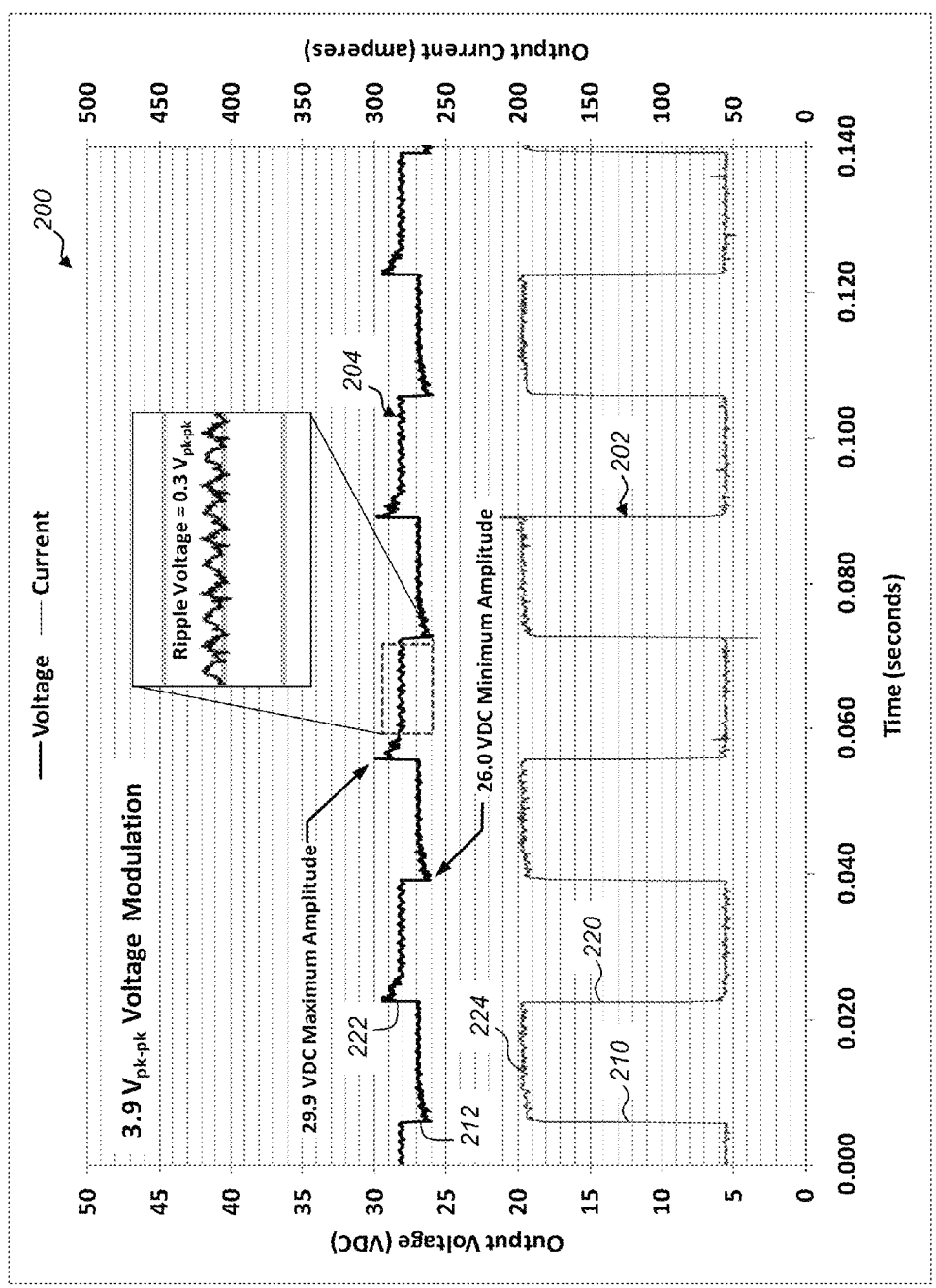
FIG. 2B is a plot of current and voltage waveforms for an exemplary aircraft power supply, such as the one shown in FIG. 1 which includes a voltage modulation attenuator.

With reference to FIGS. 2A-B, there are shown plots 100, 200 which illustrate the performance of two separate aircraft DC power supplies. In FIG. 2A, plot 100 includes a current waveform 102 and a voltage waveform 104 for a prior art aircraft power supply; in FIG. 2B, plot 200 includes a current waveform 202 and a voltage waveform 204 for aircraft power supply 10 which has voltage modulation attenuator 78. Prior art aircraft power supplies may include conventional passive filter networks and a single inductor connected in series with the negative terminal of the DC voltage output, as is known to those skilled in the art. While these types of circuits may be suitable for reducing ripple voltage, they can be more susceptible to high and low voltage transients caused by dynamic loads on the DC power output.

Turning to FIG. 2A, current waveform 102 fluctuates from about 50 amps to about 190 amps; a swing of approximately 140 amps. When the current increases rapidly, such as at a rising edge 110, a corresponding voltage dip 112 occurs in voltage waveform 104. The greater the change in current (i.e., the greater the di/dt), the greater the resultant voltage drop across the series connected inductor in DC power output 14. A similar but opposite phenomenon occurs when the current decreases at a falling edge 120, which in turn causes a corresponding voltage spike 122 in voltage waveform 104. Skilled artisans will appreciate that such extreme voltage transients or fluctuations can be detrimental to equipment and hardware connected to the DC power supply.

Contrasting plot 100 with plot 200, one is able to see that voltage modulation attenuator 78 greatly reduces or mitigates fluctuations in voltage waveform 204. For example, a rising edge 210 in current waveform 202 is similar to rising edge 110 in current waveform 102; yet, it only results in a voltage dip 212 of about 2 v, as compared to voltage dip 112 which is about 10 v. Similarly, falling edge 220 causes a much smaller voltage spike 222 than that caused by falling edge 120. While not wanting to be bound by any particular theory, one explanation for this significant reduction in voltage transients is the combination and arrangement of the components of voltage modulation attenuator 78. When a device on the DC power supply suddenly demands more energy, the current flowing through inductor 84 surges and a corresponding voltage drop develops across the inductor. The voltage drop across the inductor provides the necessary turn-on voltage for diodes 88-92 (typically this is about 0.2 v-0.7 v, depending on the particular type of diode). Once diodes 88-92, which are connected in parallel with inductor 84, are biased with a suitable turn-on voltage they can operate in the forward biased condition and allow current to flow. At this point a significant amount of the total current flowing through the negative terminal of DC power output 14 may be diverted from inductor 84 to diodes 88-92. As the change in current (i.e., the di/dt) settles down and returns to a more steady state, such as during plateau 224 of waveform 202, the voltage drop across inductor 84 is reduced to below the turn-on voltage and current flow returns to the inductor from diodes 88-92.

In addition to improvements in reducing voltage transients, voltage modulation attenuator 78 may also provide a cleaner and more ideal square wave for the current. Put differently, the current waveform 102 for the prior art aircraft power supply system has transition points 130 in both the rising and falling edges 110, 120. These transition points can result in a less-than-ideal current square wave and increase the rise and fall times of the signal. The current waveform 202 for aircraft power supply 10, while not necessarily a perfect square wave, does not exhibit the same transition points. Other benefits, such as improved ripple voltage and voltage regulation, etc., may also be enjoyed with use of voltage modulation attenuator 78. It should be appreciated that the aforementioned power quality characteristics are only some of the pertinent characteristics or qualities that aircraft electrical systems can exhibit. Numerous other characteristics and operating parameters could also be used to measure or gauge the AC or DC output of an aircraft electrical system.

According to an exemplary embodiment, voltage modulation attenuator 78 is connected to a negative terminal of DC power output 14 when used with a high amperage aircraft power supply; for instance, 240 amp DC power supply. Voltage modulation attenuator 78 is connected to the positive terminal of DC power output 14 when used with a lower amperage aircraft power supply, such as a 50 amp version. Of course, these are only some possibilities, as other arrangements are certainly possible.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "like" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An aircraft power supply, comprising:
a DC power output;
a voltage modulation attenuator being coupled to at least one terminal of the DC power output and having at least one inductor and at least one diode connected in parallel;
a transformer; and
a rectifier circuit;
wherein said transformer includes a secondary winding connected to said rectifier circuit, and wherein said rectifier circuit is connected via said voltage modulation attenuator to said DC power output; and
wherein said diode comprises a first diode connected in parallel across said inductor in a reverse current flow direction and wherein said voltage modulation attenuator includes a second diode connected in parallel across said inductor in a forward current flow direction.

2. An aircraft power supply as defined in claim 1, wherein said voltage modulation attenuator includes a plurality of diodes connected in parallel across said inductor in the forward current flow direction.

3. An aircraft power supply, comprising:
a DC power output; and
a voltage modulation attenuator being coupled to at least one terminal of the DC power output and having at least one inductor and at least one diode connected in parallel;
wherein said diode comprises a first diode connected in parallel across said inductor in a reverse current flow direction and wherein said voltage modulation attenuator includes a second diode connected in parallel across said inductor in a forward current flow direction.

4. An aircraft power supply as defined in claim 3, further comprising a transformer and a rectifier circuit, wherein said transformer includes a secondary winding connected to said rectifier circuit, and wherein said rectifier circuit is connected via said voltage modulation attenuator to said DC power output.

5. An aircraft power supply as defined in claim 4, wherein said transformer further comprises a second secondary winding and a second rectifier circuit, with said second secondary winding being connected to said second rectifier circuit, and wherein said second rectifier circuit is connected via said voltage modulation attenuator to said DC power output.

6. An aircraft power supply as defined in claim 5, wherein said transformer is a three-phase transformer.

7. An aircraft power supply as defined in claim 6, wherein said transformer includes a primary winding connected in a wye configuration and said secondary windings are connected in a delta-wye configuration.

8. An aircraft power supply as defined in claim 3, wherein said voltage modulation attenuator includes a plurality of diodes connected in parallel across said inductor in the forward current flow direction.

9. An aircraft power supply as defined in claim 8, further comprising a capacitor connected across said DC power output.

10. An aircraft power supply as defined in claim 3, wherein said voltage modulation attenuator is connected series with a negative terminal of said DC power output.

11. An aircraft power supply as defined in claim 3, wherein said voltage modulation attenuator includes only passive components.

* * * * *